Figure 3:
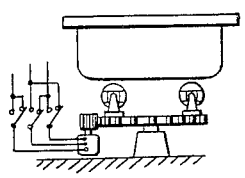

Dec. 18, 1956 L. DREYFUS 2,774,803
INDUCTIVE STIRRING DEVICE FOR METALLURGICAL FURNACE
Filed Sept. 8, 1953

Inventor
Ludwig Dreyfus
By James Aiken
Attorney.

United States Patent Office
2,774,803
Patented Dec. 18, 1956

2,774,803

INDUCTIVE STIRRING DEVICE FOR METALLURGICAL FURNACE

Ludwig Dreyfus, Vasteras, Sweden, assignor to Allmanna Svenska Elektriska Aktiebolaget, Vasteras, Sweden, a Swedish corporation Application September 8, 1953, Serial No. 378,940

Claims priority, application Sweden September 20, 1952

7 Claims. (Cl. 13—9)

It is known to stir the molten charge in an electrical arc furnace by means of a travelling field induced in the molten charge. This has been achieved by means of a stirrer arranged below the non-magnetic bottom shell of the furnace, which stirrer consists of a two-phase alternating current winding located in slots in a laminated iron core. The winding is fed with a very low frequency current of about 2–0.5 cycles p./s. from a two-phase generator, and the travelling field generated by the current in the winding of this device induces eddy currents in the molten charge. These eddy currents co-act with the field to create forces which, near the bottom of the furnace, will move the charge. This movement creates an upward flow at the edge of the hearth and a return flow in the upper part of the bath.

The above-described stirring arrangement works very satisfactorily in that a stirring of the molten charge is attained which makes the molten metal more homogeneous. In addition the movement at the surface of the molten charge prevents excessive overheating of the charge near the arcs and the deslagging of the charge is also facilitated. The arrangement is, however, rather expensive due on the one hand to the high cost of the iron core and the winding, which latter must be made of water cooled copper pipes, and on the other hand due to the high cost of the two-phase generator with its driving motor and exciter, which generator is large and expensive due to the fact that the current to a large extent is reactive.

The present invention concerns an inductive stirring device which is much cheaper and by means of which a low frequency travelling field can be created in the molten charge in a metallurgical furnace, irrespective of whether it is an arc furnace, open hearth furnace or hot metal mixer. In addition to being less expensive than the hitherto used arrangement, the new arrangement has the advantage that there is no water cooled winding below the bottom of the furnace so that the risk of explosions arising from molten metal coming into contact with water in the winding, if the furnace lining should fracture, is entirely eliminated.

The invention is characterised in that below the bottom of the furnace two or more two-pole magnets are mounted on substantially horizontal rotatable shafts, said shafts being substantially parallel to one another and driven synchronously at a suitable low speed. The magnets may either be permanent magnets or consist of direct current excited electromagnets.

In the case of a stirrer according to the invention having two two-pole magnets, for the generation of a two-phase travelling field, the best result is reached if the magnet shafts are arranged below the bottom of the furnace at a distance from each other practically equal to twice the length of the magnets. In order that the magnetic field shall be able to penetrate into the molten charge, it is further necessary that the bottom shell of the furnace within an area at least twice as wide as the axial length of the magnets and twice as long as the distance between the rotating shafts, is made from a non-magnetic material, the specific electric resistance of which should be as high as possible, for example non-magnetic steel.

The rotating shafts are suitably driven synchronously in the same direction with a speed that is determined by the formula $$\left(\frac{75}{d}+\frac{17500}{d^2}\right)<n<\left(\frac{75}{d}+\frac{35000}{d^2}\right)$$

where $d$ designates the distance between the shafts in cms. and $n$ the number of revolutions per second of the shafts.

Figure 1:
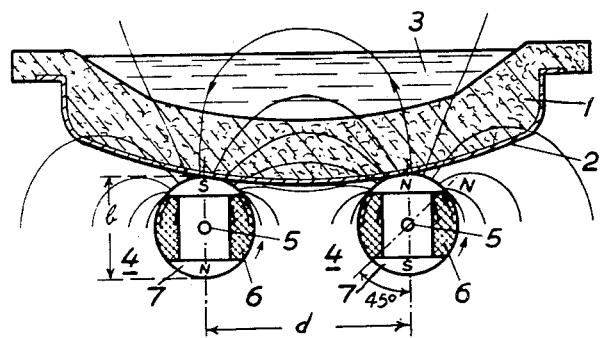
Figure 2:
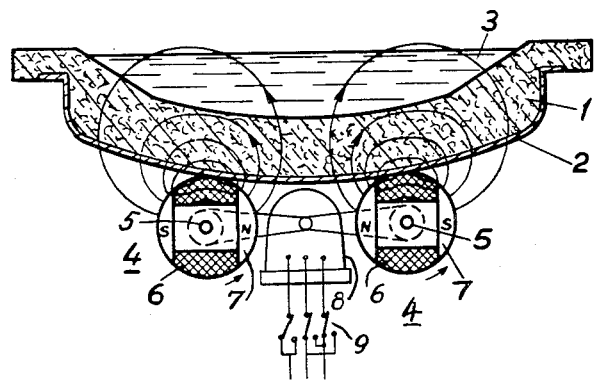

The invention will now be described with reference to the accompanying drawing in which, Figure 1 is a sectional elevation of a metallurgical furnace provided with an inductive stirrer according to the invention and showing the magnetic lines of force when the pole axes of the magnets are directed towards the bottom of the furnace, and Figure 2 is a sectional elevation of the furnace according to Figure 1 showing the pole axes turned through 90° from the positions of Figure 1 so that the pole axes are in alignment and like poles are turned towards each other.

Figure 4:
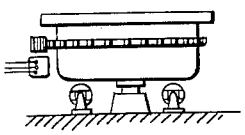
Figure 5:
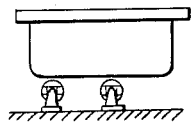

Figs. 3, 4 and 5 illustrate modifications of the present invention.

In the drawing, 1 designates the lining of the furnace bottom, 2 the non-magnetic shell and 3 the molten metal charge. 4 designates the magnets which are rotated by the shafts 5, the shafts being rotatable in either direction. 6 are the magnet windings and 7 the pole shoes. In order that the magnets shall not de-magnetise each other too much, the distance $d$ between the rotating shafts should be at least equal to twice the length $l$ of the magnets in the direction of the pole axis. The arrangement for driving the shafts 5 is indicated diagrammatically in Fig. 2 as a motor 8, coupled with the shafts 5. The direction of rotation of the motor may be reversed as indicated by the switch 9.

It is not necessary for the pole axes to be parallel to one another, for they can be displaced in relation to each other up to 45° as shown in Fig. 1. In order to achieve an effective stirring of the molten charge in the whole furnace, the whole stirring device, and possibly the bottom lining of the furnace as well, may be made rotatable in relation to the furnace as shown in Figs. 3 and 4. Moreover, in order to achieve a rotation of the surface of the charge so that deslagging is facilitated, the whole stirring device may be made movable in relation to the vertical axis of symmetry of the furnace, in the case of a circular furnace, or in relation to the vertical plane of symmetry in the case of a rectangular furnace, or the stirring device may be permanently arranged asymmetrically with respect to this axis or this plane as shown in Fig. 5.

I claim as my invention:

1. Inductive stirring means for metallurgical furnaces, comprising at least two two-pole magnet wheel systems mounted below the furnace, substantially parallel and horizontal shafts carrying said wheel systems, and means whereby the wheel systems are synchronously rotated in the same direction, the pole axes of said magnet wheel systems being substantially parallel and in an angular relationship no greater than 45°, and the polarities of said systems being opposed.

2. Inductive stirring means for metallurgical furnaces, comprising a plurality of two-pole magnetic wheel systems mounted below the furnace, substantially parallel and horizontal shafts spaced from each other and carrying said wheel systems, and means whereby the wheel systems are rotated synchronously in the same direction, the pole axes of said magnet wheel systems being substantially parallel, and the polarities of said systems being opposed, and the distance between the said shafts being twice the radial length of the magnet wheels.

3. Inductive stirring means according to claim 1, wherein the magnetic wheel systems are rotated synchronously below the furnace with a speed determined by the formula $$\left(\frac{75}{d}+\frac{17500}{d^2}\right)<n<\left(\frac{75}{d}+\frac{35000}{d^2}\right)$$

where $d$ is the distance between the center axes of the magnet wheel systems in cm. and $n$ is the number of revolutions of the shafts.

4. Inductive stirring means according to claim 1 for a furnace provided with a metal shell made from non-magnetic material with high specific electric resistance, in which the shell has a width at least twice as large as the axial length of the magnet wheels and a length at least twice as large as the distance between the center axes of the said shafts.

5. Inductive stirring means according to claim 1, comprising means for reversing the direction of rotation of the said shafts.

6. Inductive stirring means according to claim 1, in which the furnace is substantially circular, and comprising means for turning the furnace and the said magnet wheel systems with respect to each other about an axis extending vertically through the furnace.

7. Inductive stirring means according to claim 1, in which the said magnet wheel systems are arranged asymmetrically with respect to the vertical plane of symmetry of the furnace.

References Cited in the file of this patent

UNITED STATES PATENTS

| | | |
|---|---|---|
| 1,068,558 | Bally | July 29, 1915 |
| 1,822,539 | Northrup | Sept. 8, 1931 |
| 1,851,984 | Rennerfelt | Apr. 5, 1932 |
| 2,211,377 | Langasser et al. | Aug. 13, 1940 |
| 2,513,082 | Dreyfus | June 27, 1950 |
| 2,538,979 | Parage | Jan. 23, 1951 |
| 2,573,319 | Dreyfus et al. | Oct. 30, 1951 |
| 2,620,366 | Ladell | Dec. 2, 1952 |
| 2,652,441 | Gynt et al. | Sept. 5, 1953 |
| 2,655,011 | Ihle et al. | Oct. 3, 1953 |
| 2,655,354 | Murray | Oct. 13, 1953 |
| 2,665,319 | Dreyfus | Jan. 5, 1954 |
| 2,686,823 | Jones | Aug. 17, 1954 |

FOREIGN PATENTS

| | | |
|---|---|---|
| 481,730 | Italy | June 9, 1953 |
| 999,012 | France | Sept. 26, 1951 |